United States Patent
Takigawa

(10) Patent No.: US 9,250,838 B2
(45) Date of Patent: Feb. 2, 2016

(54) TERMINAL DEVICE, OUTPUT SYSTEM, AND OUTPUT METHOD

(71) Applicant: Minako Takigawa, Tokyo (JP)

(72) Inventor: Minako Takigawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/477,175

(22) Filed: Sep. 4, 2014

(65) Prior Publication Data

US 2015/0103370 A1      Apr. 16, 2015

(30) Foreign Application Priority Data

Oct. 16, 2013   (JP) ................................. 2013-215476

(51) Int. Cl.
```
G06K 15/00      (2006.01)
G06F 3/12       (2006.01)
G06F 21/60      (2013.01)
```

(52) U.S. Cl.
CPC ............ G06F 3/1222 (2013.01); G06F 3/1238 (2013.01); G06F 21/608 (2013.01)

(58) Field of Classification Search
CPC .... G06F 3/1222; G06F 3/1238; G06F 3/1239
USPC ................ 358/1.1–3.29, 1.11–1.18
See application file for complete search history.

(56) References Cited

U.S. PATENT DOCUMENTS

| | | | | |
|---|---|---|---|---|
| 5,648,810 | A * | 7/1997 | Tanuma et al. | 347/130 |
| 2003/0210429 | A1* | 11/2003 | Yamashita | 358/1.18 |
| 2007/0097415 | A1* | 5/2007 | Okamoto | 358/1.14 |
| 2014/0063522 | A1* | 3/2014 | Kobayashi | G06F 3/1293 358/1.13 |

FOREIGN PATENT DOCUMENTS

| | | |
|---|---|---|
| JP | 2013-030022 | 2/2013 |
| JP | 2013-084179 | 5/2013 |

\* cited by examiner

*Primary Examiner* — Marcellus Augustin
(74) *Attorney, Agent, or Firm* — Harness, Dickey & Pierce, P.L.C.

(57) ABSTRACT

A terminal device to which an information processing device and an output device are connected, includes a substitute user setting unit configured to set a substitute user as an executor capable of executing output of output data specified by a user requesting the output of the output data, the substitute user being different from the user requesting the output of the output data; an output information transmission unit configured to send, to the information processing device, the specified output data and output data relevance information including substitute user information identifying the substitute user; an output data acquisition unit configured to acquire the output data, of which the output is set as being executable by the executor, from the information processing device; and an output data transmission unit configured to send the output data acquired by the output data acquisition unit, to the output device connected to the terminal device.

12 Claims, 12 Drawing Sheets

| USER ID | PASSWORD | USER NAME |
|---------|----------|-----------|
| user1   | ******   | USER 1    |
| user2   | ******   | USER 2    |
| user10  | ******   | USER 10   |

| JOB ID | JOB NAME | PRINT DATA FORMAT | USER ID | SUBSTITUTE USER ID |
|--------|----------|-------------------|---------|--------------------|
| 1 | 1.txt-MEMO PAD | XPS | user1 | user10 |
| 2 | 2.doc-○○○2010 | PCL | user2 | |
| 3 | 3.xls-×××2010 | PCL | user10 | |
| ... | ... | ... | ... | ... |

TERMINAL DEVICE, OUTPUT SYSTEM, AND OUTPUT METHOD

BACKGROUND OF THE INVENTION

1. Field of the Invention

The present invention relates to a terminal device, an output system, and an output method.

2. Description of the Related Art

Conventionally, there is known a technology of delegating the authority to output print target data to be output from a printing device, to a substitute user, and having the substitute user output the print target data (see, for example, Patent Document 1).

However, in the above conventional technology, the print request made at the terminal device of the user is accumulated in a device connected to the network, and therefore the substitute user cannot output the print target data from a printing device that is not connected to the network. Thus, even if a printing device is connected to the terminal device of the substitute user by an interface such as USB, the substitute user needs to output the print target data from a printing device connected to the network. Furthermore, the substitute user cannot output the data by specifying a desired device from the terminal device. Accordingly, when outputting output data accumulated in a device, the user cannot output the data by making use of the functions and the performance of his/her own terminal device, and therefore the convenience is impaired.

Patent Document 1: Japanese Laid-Open Patent Publication No. 2013-084179

SUMMARY OF THE INVENTION

The present invention provides a terminal device, an output system, and an output method, in which one or more of the above-described disadvantages are eliminated.

According to an aspect of the present invention, there is provided a terminal device to which an information processing device and an output device are connected. The terminal device includes a substitute user setting unit configured to set a substitute user as an executor capable of executing output of output data specified by a user requesting the output of the output data, the substitute user being different from the user requesting the output of the output data; an output information transmission unit configured to send, to the information processing device, the specified output data and output data relevance information including substitute user information identifying the substitute user; an output data acquisition unit configured to acquire the output data, of which the output is set as being executable by the executor, from the information processing device; and an output data transmission unit configured to send the output data acquired by the output data acquisition unit, to the output device connected to the terminal device.

According to an aspect of the present invention, there is provided an output system including an output control system constituted by at least one information processing device; an output device; a terminal device; a substitute user setting unit configured to set a substitute user as an executor capable of executing output of output data specified by a user requesting the output of the output data, the substitute user being different from the user requesting the output of the output data; an output information transmission unit configured to send, by the terminal device to the output control system, the specified output data and output data relevance information including substitute user information identifying the substitute user; an output information management unit configured to save and manage, by the output control system, the output data and the output data relevance information; an output data acquisition unit configured to acquire, by the terminal device from the output control system, the output data of which the output is set as being executable by the executor, from the information processing device; an output data transmission unit configured to send the output data acquired by the output data acquisition unit, to the output device connected to the terminal device; and an output unit configured to receive, by the output device, the output data sent by the output data transmission unit, and to execute, by the output device, the output of the data.

According to an aspect of the present invention, there is provided an output method performed by an output system including an output device configured to execute output of output data, an output control system constituted by at least one information processing device, the output control system being configured to manage the output data and user information of an executor of the output data, and a terminal device connected to the output device and the output control system. The output method includes setting, from the terminal device used by a first user, a second user specified by the first user as the executor capable of executing the output of the output data specified by the first user; acquiring, from the terminal device used by the second user, the output data specified by the first user for which the second user is set as the executor in the output control system; sending the output data specified by the first user, from the terminal device used by the second user to the output device that is an output destination specified by the second user; and outputting, by the output device that is the output destination specified by the second user, the output data specified by the first user.

BRIEF DESCRIPTION OF THE DRAWINGS

Other objects, features and advantages of the present invention will become more apparent from the following detailed description when read in conjunction with the accompanying drawings, in which:

FIG. 4 is a process block diagram of an example of a print job registration plug-in;

FIG. 5 is a process block diagram of an example of a print job acquisition plug-in;

FIG. 6 is a process block diagram of an example of a print plug-in;

FIG. 7 is a process block diagram of an example of an account transmission plug-in;

FIG. 8 is a configuration diagram of an example of user information;

FIG. 9 is a configuration diagram of an example of print job information;

DETAILED DESCRIPTION OF THE PREFERRED EMBODIMENTS

A detailed description is given, with reference to the accompanying drawings, of embodiments of the present invention. Note that in the present embodiment, a printing system is described as an example of an output system; however, the present invention is not limited to a printing system. The output system may be a projection system, a display system, or a system that outputs a job that is registered in a registration destination.

System Configuration

Figure 1:
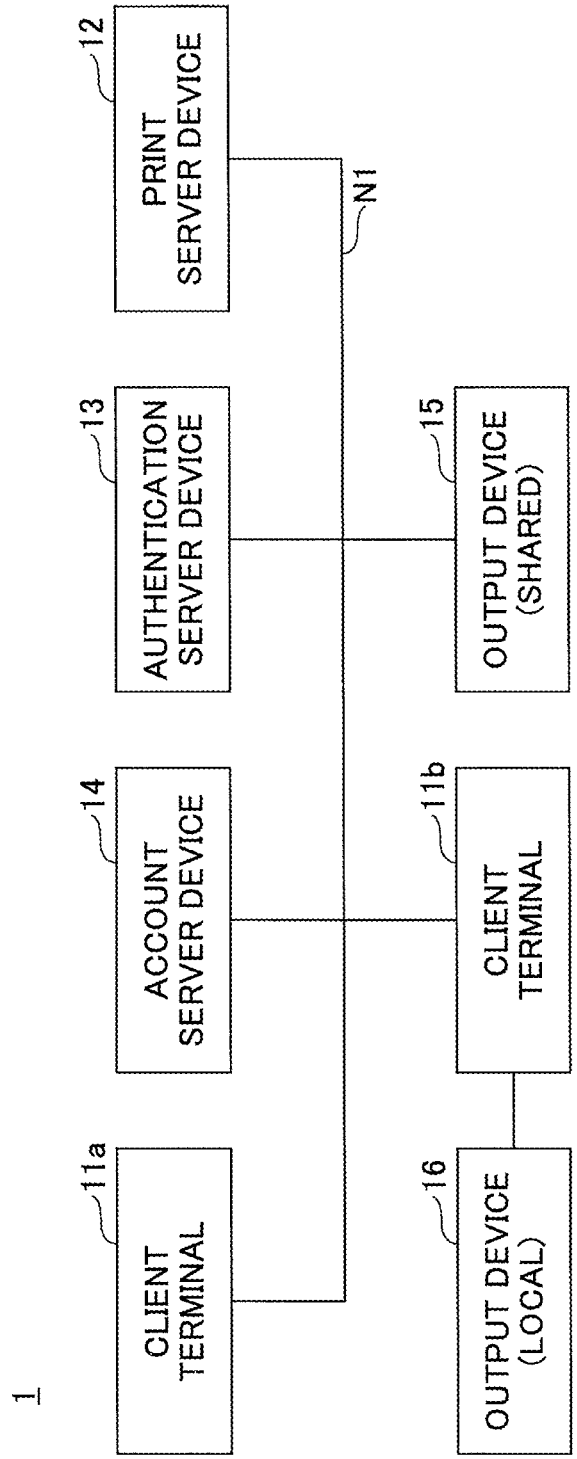
FIG. 1 is a configuration diagram of an example of a printing system according to an embodiment.

FIG. 1 is a configuration diagram of an example of a printing system according to the present embodiment. A printing system 1 of FIG. 1 includes a client terminal 11a, a client terminal 11b, a print server device 12, an authentication server device 13, an account server device 14, and a shared output device 15, which are connected to each other via a network N1 such as a LAN. Furthermore, the printing system 1 includes a local output device 16 connected to the client terminal 11b.

The client terminal 11a, the client terminal 11b, the print server device 12, the authentication server device 13, the account server device 14, the shared output device 15, and the local output device 16 include a wireless or wired communication unit.

In FIG. 1, there is one of each of the print server device 12, the authentication server device 13, the account server device 14, the shared output device 15, and the local output device 16; however, there may be a plurality of each of these devices. Furthermore, in the example of FIG. 1, there are two client terminals 11; however, there may be three or more client terminals.

The client terminal 11a and the client terminal 11b are information processing devices (computer systems) such as PCs used by the user. The client terminal 11a and the client terminal 11b are terminal devices such as a smartphone, a mobile phone, or a PC. In the following, when the client terminal 11a and the client terminal 11b are not distinguished from each other, these are simply referred to as a client terminal 11.

The print server device 12 is realized by one or more information processing devices. The print server device 12 registers print data and print job information sent from the client terminal 11 or the output device 15. Furthermore, based on a request from the client terminal 11, etc., the print server device 12 sends print data and print job information to the client terminal 11, etc.

The authentication server device 13 is realized by one or more information processing devices. The authentication server device 13 holds user information, and performs authentication based on a request from the client terminal 11, etc.

The account server device 14 is realized by one or more information processing devices. The account server device 14 holds account information such as the number of sheets on which print data has been printed by an instruction from the user.

The common output device 15 is an image forming apparatus such as a printer, connected to the network N1 by wired or wireless communication. The output device 15 may be an image forming apparatus such as a printer, a copier, a multifunction peripheral, and a laser printer; a projection device or a display device for executing display output such as a projector and a monitor; or a sound output device for outputting sound data such as audio data. Furthermore, there may be a plurality of the output devices 15 manufactured by different manufacturers. For example, the system may include an output device 15 that can use the functions of the print server device 12 (i.e., an output device 15 in which application software for using the functions is installed), and an output device 15 that cannot use the functions of the print server device 12 (i.e., an output device 15 in which application software for using the functions is not installed).

The output device 16 may be an image forming apparatus such as a printer, a copier, a multifunction peripheral, and a laser printer; a projection device or a display device for executing display output such as a projector or a monitor; and a sound output device for outputting sound data such as audio data. Furthermore, there may be a plurality of the output devices 16 manufactured by different manufacturers. For example, the output device 16 may be manufactured by a different manufacturer from that of the output device 15 (or an output device 15 that can use functions of the print server device 12). For example, by having application software for using the output device 16 (for example, a printer driver corresponding to the output device 16) installed in the client terminal 11b, the client terminal 11b can cause the output device 16 to execute the output of data.

Note that the printing system 1 of FIG. 1 is one example, and the printing system 1 may not include the output device 15. Furthermore, the functions included in the device (for example, the print server device 12, the authentication server device 13, and the account server device 14) that plays the role of receiving an output request from the client terminal 11, executing output to the output device 15 or the output device 16, and managing the output of the executed output, may be realized by a single information processing device. Therefore, part of or all of the functions of the print server device 12, the authentication server device 13, and the account server device 14 are constituted by one or more information processing devices, thus realizing an output system for managing output data such as print data and controlling the output of output data.

Hardware Configuration

Figure 2:
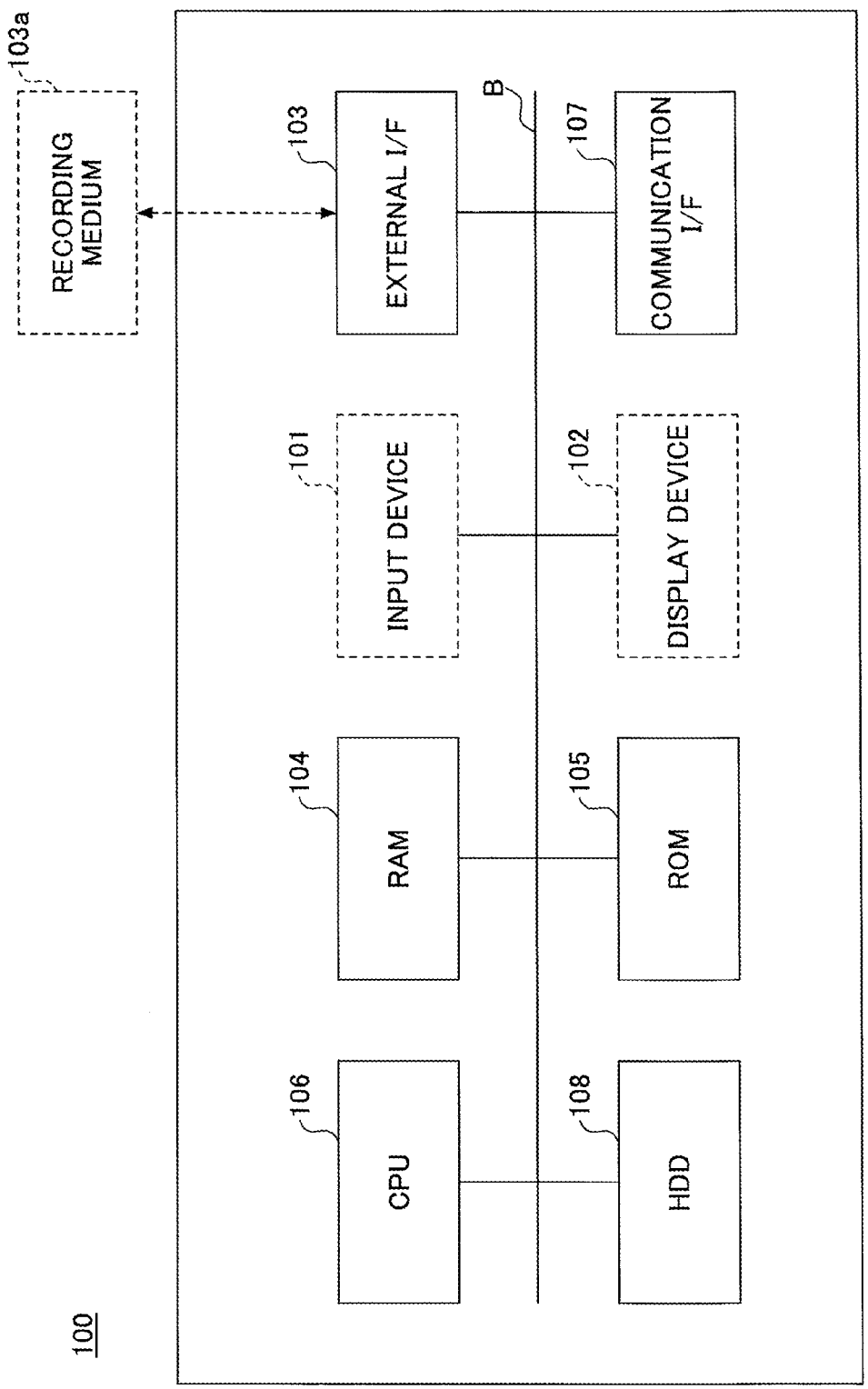
FIG. 2 is a hardware configuration diagram of an example of a computer system according to an embodiment.

The client terminal 11, the print server device 12, the authentication server device 13, and the account server device 14 of FIG. 1 are realized by a computer system, etc., having a hardware configuration as illustrated in FIG. 2. FIG. 2 is a hardware configuration diagram of an example of a computer system according to the present embodiment.

A computer system 100 illustrated in FIG. 2 includes an input device 101, a display device 102, an external I/F 103, a RAM (Random Access Memory) 104, a ROM (Read Only Memory) 105, a CPU (Central Processing Unit) 106, a communication I/F 107, and a HDD (Hard Disk Drive) 108, which are connected to each other via a bus B. Note that the input device 101 and the display device 102 may be connected and used when needed.

The input device 101 includes a keyboard and a mouse, which are used by the user to input various operation signals. The display device 102 includes a display, and displays processing results by the computer system 100.

The communication I/F 107 is an interface for connecting the computer system 100 to a network N1, etc. Accordingly, the computer system 100 can perform data communication via the communication I/F 107.

The HDD 108 is a nonvolatile storage device storing programs and data. The stored programs and data include, for example, an OS (Operating System) which is the basic software for controlling the entire computer system 100, and application software for providing various functions in the OS. The HDD 108 manages the stored programs and data by a predetermined file system and/or a DB (database).

The external I/F 103 is an interface between the computer system 100 and an external device. The external device is, for example, a recording medium 103a. Accordingly, the computer system 100 can perform reading and/or writing of data in the recording medium 103a via the external I/F 103. The recording medium 103a is, for example, a CD (Compact Disk), a DVD (Digital Versatile Disk), a SD memory card, or a USB memory (Universal Serial Bus memory).

The ROM 105 is a nonvolatile semiconductor memory (storage device) capable of storing programs and data even after the power is turned off. The ROM 105 stores BIOS (Basic Input/Output System) executed when the computer system 100 is activated, an OS setting, and programs and data such as network settings. The RAM 104 is a volatile semiconductor memory (storage device) for temporarily saving programs and data.

The CPU 106 is a processing device that loads the programs and data from the storage devices such as the ROM 105 and the HDD 108 into the RAM 104, and executes processes to implement control and functions of the entire computer system 100.

The client terminal 11, the print server device 12, the authentication server device 13, and the account server device 14 according to the present embodiment can realize various processes described below by the above-described hardware configuration of the computer system 100.

Software Configuration

Client Terminal

Figure 3:
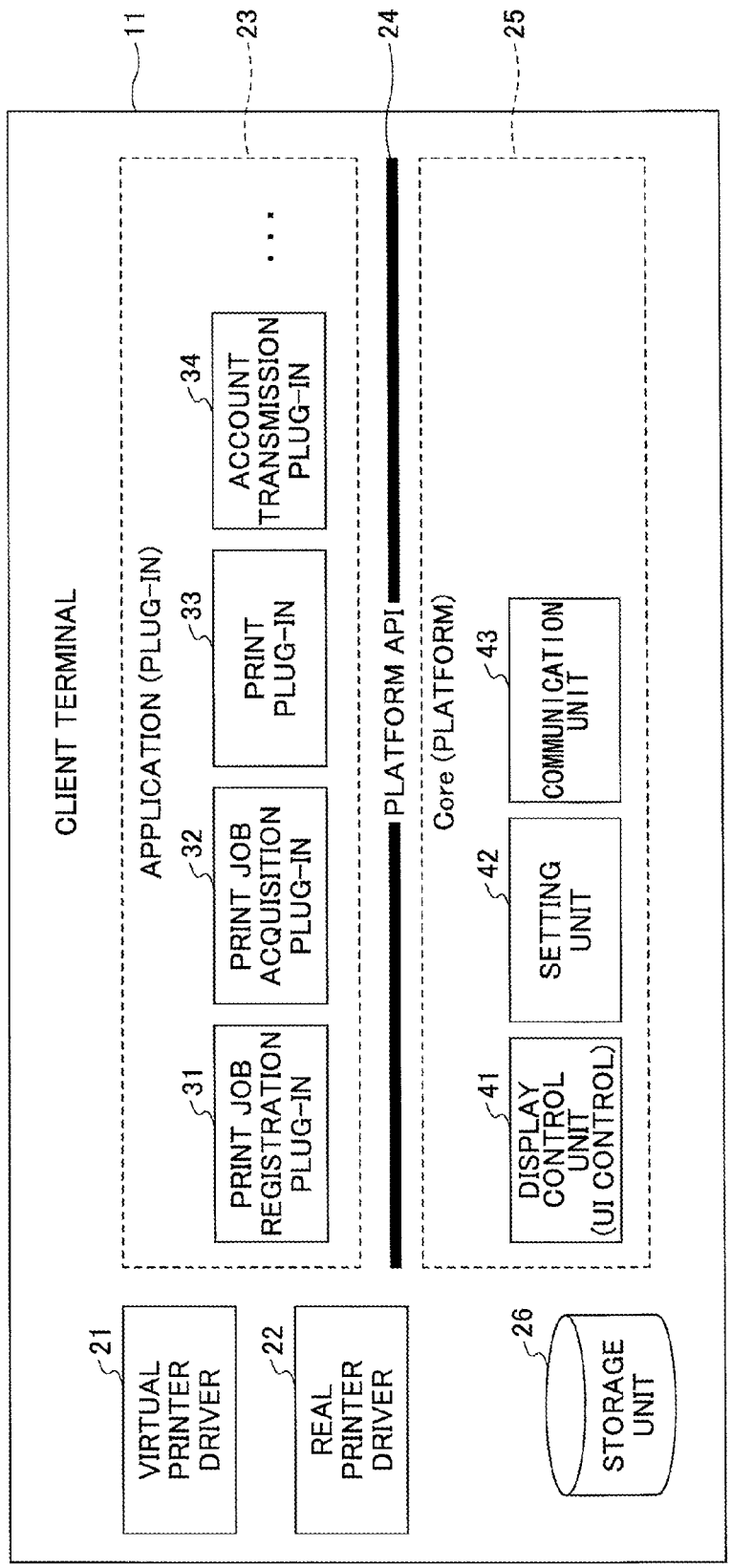
FIG. 3 is a process block diagram of an example of a client terminal according to an embodiment.

The client terminal 11 according to the present embodiment is realized by, for example, process blocks as illustrated in FIG. 3. FIG. 3 is a process block diagram of an example of a client terminal according to the present embodiment.

The client terminal 11 executes programs to realize a virtual printer driver 21, a real printer driver 22, plug-ins 23, a platform API 24, a platform 25, and a storage unit 26.

The plug-ins 23 include a print job registration plug-in 31, a print job acquisition plug-in 32, a print plug-in 33, and an account transmission plug-in 34. The platform 25 includes a display control (UI control) unit 41, a setting unit 42, and a communication unit 43.

The virtual printer driver 21 is a printer driver that converts the application data into intermediate print data that does not depend on the model, and outputs the intermediate print data. Note that the intermediate print data is print data that does not depend on the model of the output device 15, etc. Data of a XPS (XML Paper Specification) format is an example of intermediate print data.

Furthermore, the application data is an example of output target data that is specified by the user as a target of output.

The real printer driver 22 is a printer driver that converts the application data or the intermediate print data into real print data in a format that can be printed by the output device 15 or the output device 16, and outputs the real print data. The data in a RAW format is an example of real print data. In the following, when the intermediate print data and the real print data are not distinguished from each other, these are simply referred to as print data.

Note that the output target data, the intermediate print data, and the real print data such as application data (data in a data format complying with the application) are examples of output data handled as the target of output, from when the output request is received at the client terminal 11 a from user to when the data is output by the output device. Furthermore, the output data is not limited to data used for print output; the output data may be data used for display (projection) output (display (image) data), and data used for sound output (sound data). Output data corresponding to one or more output purposes among print, display, and sound replay, may be handled.

The plug-in 23 is software operating on the platform 25. The plug-in 23 can use functions of the platform 25 by using the platform API 24.

The print job registration plug-in 31 of the plug-in 23 registers a print job in the print server device 12. The print job acquisition plug-in 32 acquires a print job from the print server device 12. The print plug-in 33 sends a print job including the print job information and the print data, to the output device 15 or the output device 16. The account transmission plug-in 34 generates account information from the print job information sent to the output device 15 or the output device 16 from the print plug-in 33, and sends the account information to the account server device 14.

The platform API 24 is an interface for the plug-in 23 to use the functions of the platform 25. The platform API 24 is a pre-defined interface that is provided for the platform 25 to receive requests from the plug-in 23, and is constituted by, for example, functions and classes.

The display control unit 41 of the platform 25 controls the display of the display device 102 based on a request from, for example, the plug-in 23. The setting unit 42 sets the plug-in 23. The communication unit 43 executes communication with the print server device 12, etc. The storage unit 26 stores settings, etc.

The client terminal 11 integrates the functions commonly used by the plug-in 23 on the platform 25, to integrate the processes. Note that the classification configuration of the process block diagram of FIG. 3 is one example, and the elements need not be classified by the layers as illustrated in FIG. 3.

Print Job Registration Plug-in

Figure 4:
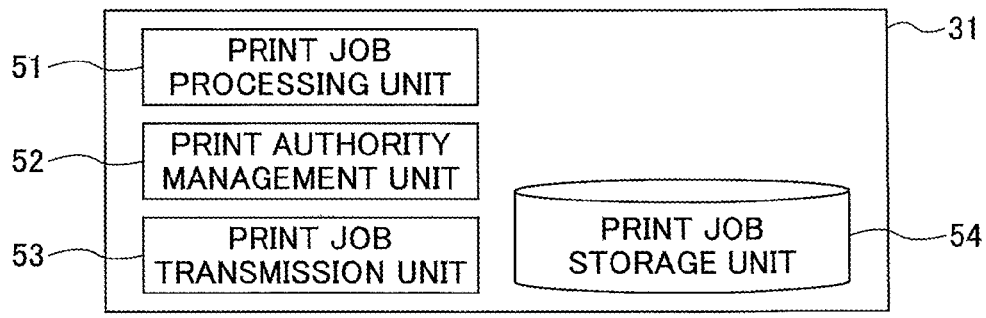

The print job registration plug-in 31 of the client terminal 11 is realized by, for example, process blocks illustrated in FIG. 4. FIG. 4 is a process block diagram of an example of the print job registration plug-in 31.

The print job registration plug-in 31 illustrated in FIG. 4 includes a print job processing unit 51, a print authority management unit 52, a print job transmission unit 53, and a print job storage unit 54. The print job processing unit 51 adds substitute user information such as a substitute user ID, to the print job information included in the print job. The print authority management unit 52 acquires the substitute user information from the authentication server device 13 and passes the substitute user information to the print job processing unit 51. The print job transmission unit 53 sends the print job to the print server device 12. The print job storage unit 54 stores the print job.

Print Job Acquisition Plug-in

Figure 5:
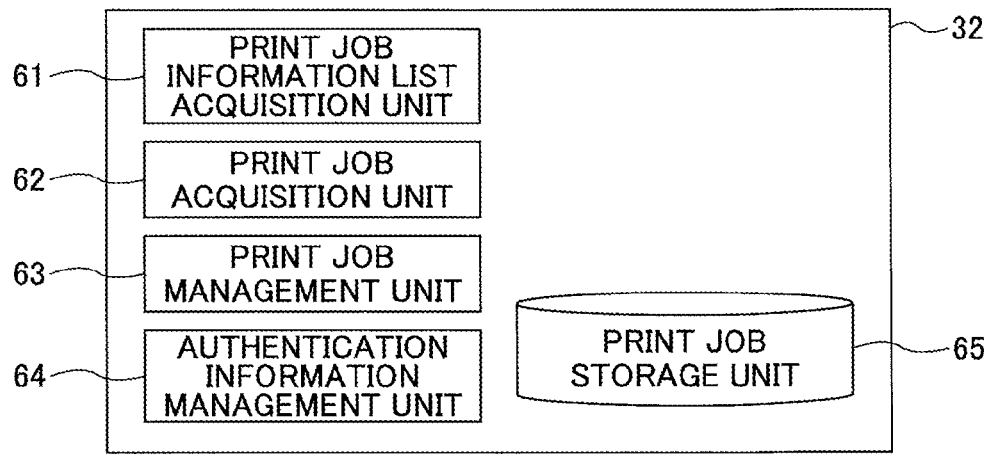

The print job acquisition plug-in 32 of the client terminal 11 is realized by, for example, process blocks illustrated in FIG. 5. FIG. 5 is a process block diagram of an example of the print job acquisition plug-in 32.

The print job acquisition plug-in 32 illustrated in FIG. 5 includes a print job information list acquisition unit 61, a print job acquisition unit 62, a print job management unit 63, an authentication information management unit 64, and a print job storage unit 65. The print job information list acquisition unit 61 acquires a print job information list of print jobs that can be printed, from the print server device 12. The print job acquisition unit 62 acquires a print job selected from the print job information list, from the print server device 12. The print job management unit 63 manages print jobs acquired by the print job acquisition unit 62. The authentication information management unit 64 manages authentication information of the user when acquiring a print job information list from the print server device 12. The print job storage unit 65 stores the print job acquired from the print server device 12.

Print Plug-in

Figure 6:
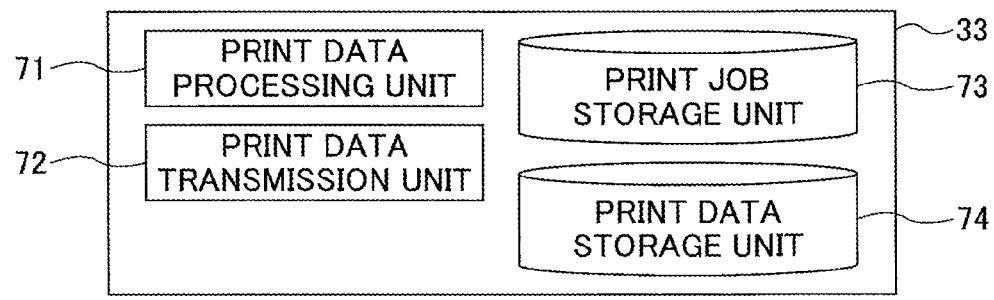

The print plug-in 33 of the client terminal 11 is realized by, for example, process blocks illustrated in FIG. 6. FIG. 6 is a process block diagram of an example of the print plug-in 33.

The print plug-in 33 illustrated in FIG. 6 includes a print data processing unit 71, a print data transmission unit 72, a print job storage unit 73, and a print data storage unit 74. The print data processing unit 71 converts the data format of the print data included in the print job. The print data transmission unit 72 sends the print data to the output device 15 or the output device 15. The print job storage unit 73 stores the print job. The print data storage unit 74 stores the print data included in the print job.

Account Transmission Plug-in

Figures 7, 8, 9:
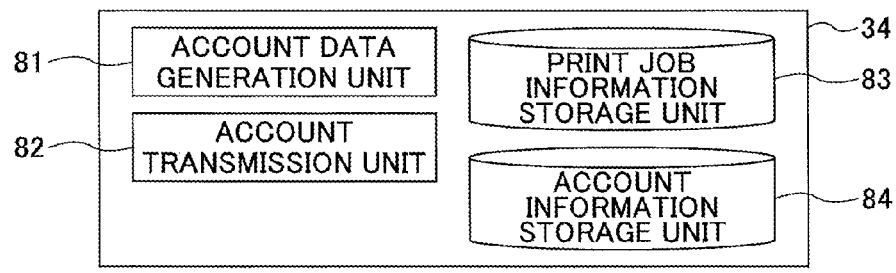

The account transmission plug-in 34 of the client terminal 11 is realized by, for example, process blocks illustrated in FIG. 7. FIG. 7 is a process block diagram of an example of the account transmission plug-in 34.

The account transmission plug-in 34 illustrated in FIG. 7 includes an account data generation unit 81, an account transmission unit 82, a print job information storage unit 83, and an account information storage unit 84. The account data generation unit 81 generates account information from the print job information received from the print plug-in 33. The account information includes the information of the user who requested the printout, the number of printed copies, and the sheet size, etc. The account transmission unit 82 sends the account information to the account server device 14. The print job information storage unit 83 stores the print job information. The account information storage unit 84 stores the account information generated by the account data generation unit 81. Note that the storage units included in the respective plug-ins can use the storage unit 26 of the client terminal 11.

User Information

FIG. 8 is a configuration diagram of an example of user information. The user information is information for associating a user ID, a password, and a user name. For example, in the user information of FIG. 8, a password and a user name are set for each of the user IDs "user1", "user2", and "user10". Note that the user information is included in the authentication server device 13.

Print Job Information

FIG. 9 is a configuration diagram of an example of print job information. The print job information includes data items such as a job ID, a job name, a print data format, a user ID, and a substitute user ID.

The job ID is identification information of a print job. The job name is the name of the print job. The print data format is the format of the print data registered in the print server device 12. For example, in the print job information of FIG. 9, when the print data format is "XPS", this indicates that the intermediate print data is registered in the print server device 12. When the print data format is "PCL", this indicates that the real print data is registered in the print server device 12.

Note that intermediate print data is print data in a format which has a common specification relevant to the format that is open to the public, and which is easy to re-edit. Furthermore, the data format of the intermediate print data is not limited to XPS (XML Paper Specification). For example, the data format of the intermediate print data may be PDF (Portable Document Format).

Meanwhile, real print data is print data in PDL (Page Description Language) dependent on the printing device. The data format of the real print data is not limited to PCL (Printer Control Language). For example, the data format of the real print data may be PS (Post Script).

One of the differences between the intermediate print data and the real print data is that, for example, there is a difference in the degree of freedom with respect to changing the settings (editing the output data) relevant to the output configuration of print data, including a setting of the print side such as double-sided/single-sided, a setting of the color mode such as color/monochrome, and a setting of combining such as 2 in 1. For example, in the case of the intermediate print data such as XPS, it is possible to change the setting of the print side, change the setting of the color mode, and change the setting of combining. However, in the case of the real print data such as PCL, it is possible to change the setting of the print side and change the setting from color to monochrome, but there are limitations in changing settings in that it is not possible to change the setting from monochrome to color or to change the combining setting. One aspect of the intermediate print data being data in a format that is easy to re-edit, is the degree in freedom in changing the settings relevant to the output configurations as described above.

Therefore, the intermediate data such as the intermediate print data, which is used in an intermediate stage until the output target data (application data) is converted into real output data (real print data) received by the output device when actually being output, is easier to be edited than the real output data, or is less dependent on the model or device compared to real output data (has versatility). Thus, the intermediate data is in a data format that provides convenience in terms of selecting and editing, when the user executes the output.

The user ID is user identification information that indicates the owner of the print data (the requesting user who requested the output by specifying the output target data from the client terminal 11). The substitute user ID is the user ID of the substitute user that can print the print job (the substitute execution user who is specified as the executer who can execute the output of the output target data specified by the requesting user). For example, when the user of the user ID "user 10" requests to acquire the print job information list, it is possible to display, on the display device 102 of the client terminal 11, the print job information of the job ID "3" for which the user of the user ID "user 10" is the owner, and the print job information of the job ID "1" for which the user of the user ID "user 10" is set as the substitute user. Therefore, the user who is registered as the owner or the substitute user is the executor who can execute the output of the print data.

Details of Process

In the following, a description is given of details of the process by the printing system 1 according to the present embodiment.

Print Job Registration Process

First, a description is given of a process of generating a print job and registering the print job in the print server device 12.

Figure 10:
FIG. 10 is an image diagram of an example of a print setting screen.

For example, the user operates a document preparation application installed in the client terminal 11, opens a print setting screen 1000 as illustrated in FIG. 10, selects the virtual printer driver 21 and requests printing, to start the print job registration process.

FIG. 10 is an image diagram of an example of a print setting screen. The user can select a virtual printer driver 21 from a printer selection field 1001 of a print setting screen 1000. Note that when the terminal operated by the user is the client terminal 11b, the user may select, from the printer selection field 1001 of the print setting screen 1000, the real printer driver 22 for directly causing the shared output device 15 or the local output device 16 to execute printing.

Furthermore, the user may specify the number of copies to be printed, from the print setting screen 1000. Furthermore, the user may open a screen for making detailed print settings by pressing a "property" button 1002 in the print setting screen 1000, and make settings such as a setting of the print side such as double-sided/single-sided, a setting of the color mode such as color/monochrome, and a setting of combining such as 2 in 1. Then, when the user selects the virtual printer driver 21 and presses an "OK" button 1003 in the print setting screen 1000, a function selection screen is displayed by the display control unit 41, and the user can select the function that he/she wants to use.

Figure 12:
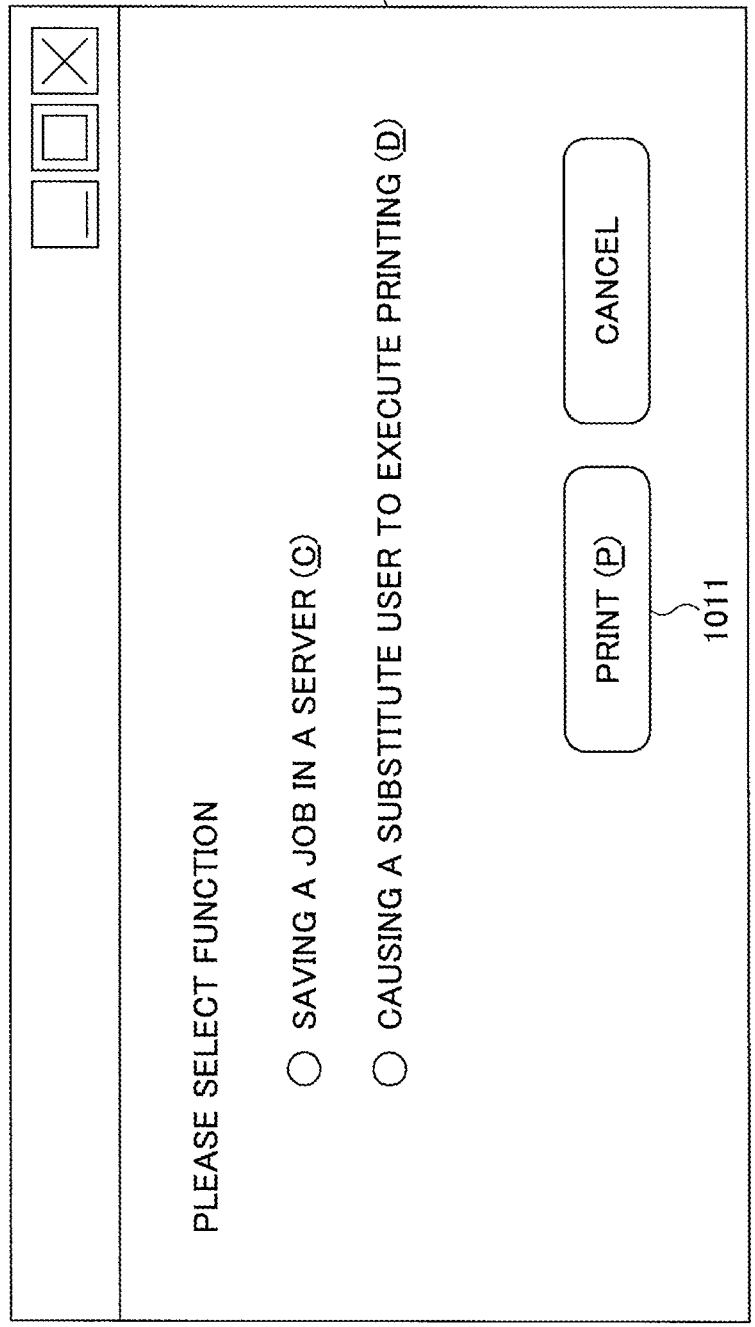
FIG. 12 illustrates an image of an example of a function selection screen.

FIG. 12 illustrates an image of an example of a function selection screen. A function selection screen 1010 is an example in which the user is prompted to select one function from a function of "saving a job in a server" and a function of "causing a substitute user to execute printing". Note that other functions may be displayed as options of functions to be selected. When the user selects the function of "saving a job in a server" and presses a "execute printing" button 1011, an output request (print request) is received, and a print job in which the user (owner) is set as the user (not including substitute user) who is capable of executing the print job, is sent to the print server device 12.

Figure 13:
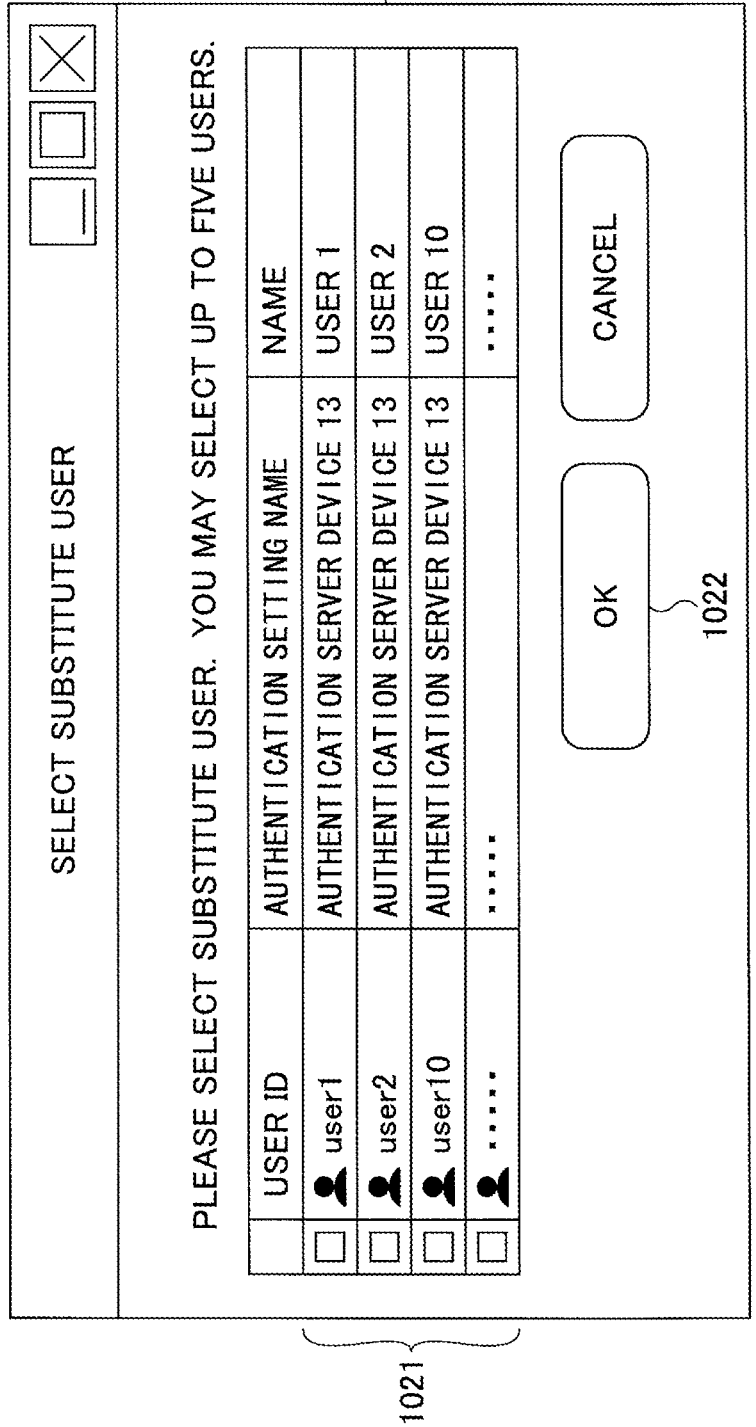
FIG. 13 illustrates an image of an example of a substitute user selection screen.

Meanwhile, when the user selects the function of "causing a substitute user to execute printing" and presses the "execute printing" button 1011, the display control unit 41 displays a substitute user selection screen for selecting a substitute user. FIG. 13 illustrates an image of an example of a substitute user selection screen.

A substitute user selection screen 1020 is an example of prompting a selection of a substitute user from a list. When the user to be selected as the substitute user is selected by a check box 1021 and an "OK" button 1022 is pressed, an output request is received, and a print job in which a user (owner) and a substitute user are set as the user who is capable of executing the print job, is sent to the print server device 12. Note that the number of users that can be selected as the substitute user may also be specified. The substitute user selection screen 1020 illustrates an example where up to five users can be selected as substitute users.

Furthermore, the substitute user may be selected by accessing the authentication server device 13 from the client terminal 11 and selecting a user registered in the authentication server device 13. Alternatively, the substitute user may be selected by registering (storing), in the client terminal 11, information of users specified as options of substitute users from the users registered in the authentication server device 13 in advance, and selecting a substitute user from the registered users. Furthermore, in the function selection screen 1010, when the function of "causing a substitute user to execute printing" is selected, a substitute user who is determined in advance may be automatically selected, without displaying the substitute user selection screen 1020.

Therefore, when giving an output request, the user can appropriately select settings relevant to the output of the output data, such as specifying the output target data, specifying the device that is the output destination (transmission destination) of the print job and the print data (the output device 15, the output device 16, the print server device 12, etc.), specifying the setting relevant to the output configuration, specifying the function to be used, and specifying the executor who can execute the output. The client terminal 11 executes a process based on a setting specified by user selection.

Figure 11:
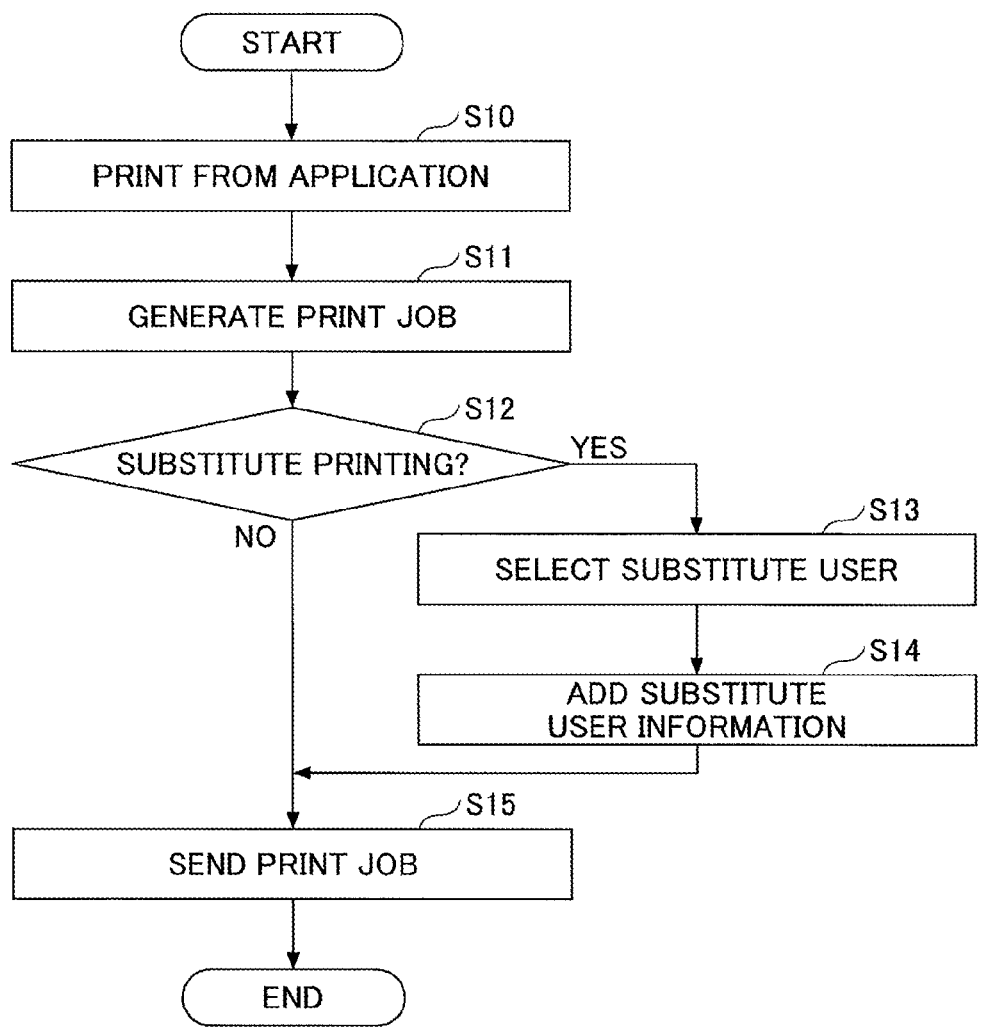
FIG. 11 is a flowchart of an example of a print job registration process.

In the following, it is assumed that the user has opened the print setting screen 1000 by operating a document preparation application installed in the client terminal 11a, and the virtual printer driver 21 has been selected and output (printing) has been requested (the client terminal 11 has received an output request according to an operation input by the user). When the user requests output, the client terminal 11a starts a print job registration process as illustrated in FIG. 11. FIG. 11 is a flowchart of an example of a print job registration process.

In step S10, the document preparation application installed in the client terminal 11a sends a print event to the virtual printer driver 21.

In step S11, the virtual printer driver 21 generates intermediate print data from the application data created by an application such as a document preparation application. The virtual printer driver 21 sends the intermediate print data to the print job registration plug-in 31. When converting the intermediate print data into real print data, the print job processing unit 51 of the print job registration plug-in 31 sends the intermediate print data to the real printer driver 22 and requests to generate real print data, and the real printer driver 22 generates real print data from the intermediate print data. The print job processing unit 51 generates print job information of the generated intermediate print data or real print data. In the print job information, the data format of the print data is registered as the item value of the print data format, a user ID of the owner user is registered as the item value of the user ID, and a file name of the application data is registered as the item value of the job name. Accordingly, a print job, including print data and print job information, is generated. Note that the print job information may include the number of pages and print settings of the intermediate print data or the real print data, or may include a job ID.

Note that as a condition of determining whether to convert the intermediate print data into real print data, the determination may be made according to whether a function of "saving a job in a server" has been selected or a function of "causing a substitute user to execute printing" has been selected in the function selection screen. In this case, when the function of "saving a job in a server" has been selected, the print job processing unit 51 may determine to convert the intermediate print data into real print data, and when the function of "causing a substitute user to execute printing" has been selected, the print job processing unit 51 may determine not to convert the intermediate print data into real print data (leave the intermediate print data as is). The condition of determination is not limited to the above; the above is an example of determining whether to convert the intermediate print data into real print data according to which function the user has selected from the functions that can be selected. Therefore, the intermediate print data may not be converted into real print data, regardless of which function the user has selected. Furthermore, the administrator or the user of the client terminal 11 may set in advance whether to convert the intermediate print data into real print data, and the print job processing unit 51 may determine whether to convert the intermediate print data into real print data based on the registered setting.

In step S12, the print authority management unit 52 of the print job registration plug-in 31 determines whether substitute printing has been selected. When a substitute user has been selected, the process proceeds to step S13. When a substitute user has not been selected, the process proceeds to step S15.

In step S13, the print authority management unit 52 of the print job registration plug-in 31 selects, as the substitute user, the user selected by the user in the substitute user selection screen.

The print authority management unit 52 of the print job registration plug-in 31 sends the information of the selected substitute user to the print job processing unit 51.

In step S14, the print job processing unit 51 of the print job registration plug-in 31 adds the information of the substitute user selected in step S13, to the print job information. For example, in FIG. 9, to the print job information of the job ID "1", the substitute user ID "user 10" is added as the information of the substitute user.

In step S15, the print job transmission unit 53 of the print job registration plug-in 31 sends the print job including the print job information and the print data to the print server device 12, and registers the print job.

According to the print job registration process of FIG. 11, by selecting substitute printing, the user can register, in the print server device 12, a print job to which information of the substitute user that can execute the print job has been added. Accordingly, the user (owner) can request the substitute user to execute the print job.

Furthermore, even when the power of the client terminal 11a of the user (owner) is off, the substitute user can execute the print job.

Printing Process

Figure 14:
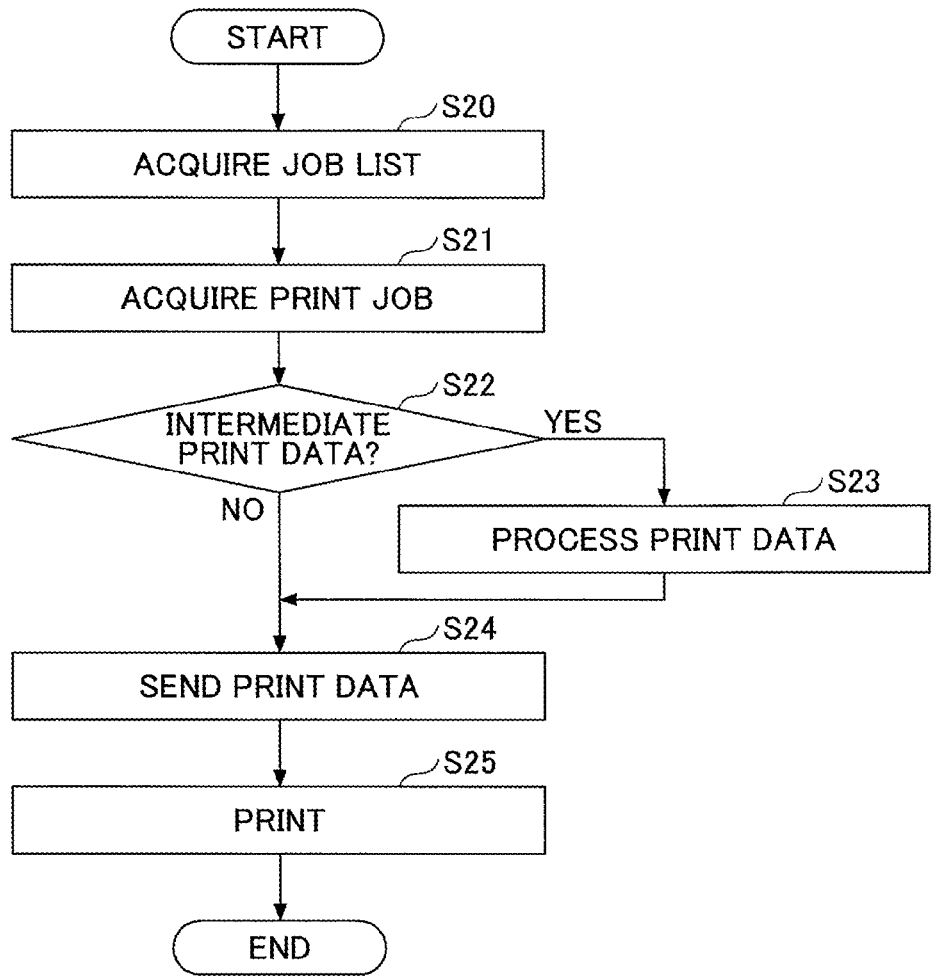
FIG. 14 is a flowchart of an example of a printing process.

Next, a description is given of a process of acquiring a print job from the print server device 12 by the user and printing the print data. FIG. 14 is a flowchart of an example of a printing process. Note that in the following, a description is given of an example of executing a print job in the output device 16 locally connected to the client terminal 11b.

Figure 15:
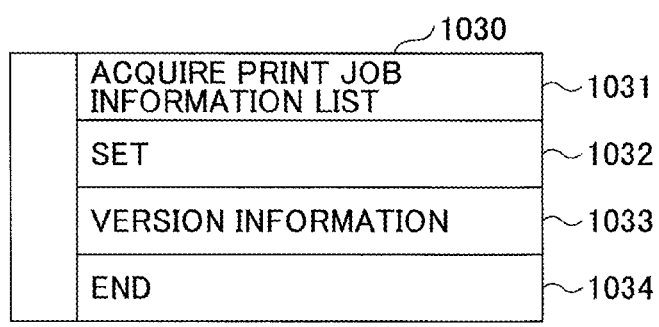
FIG. 15 is an image diagram of an example of a menu screen.

In step S20, the print job information list acquisition unit 61 of the print job acquisition plug-in 32 acquires a print job information list (list information of print jobs) of the user from the print server device 12. Here, for example, a print job information list may be displayed by being selected from a menu screen which is displayed as the user clicks a task tray icon in the desktop of the client terminal 11b. Note that when the print job information list acquisition unit 61 acquires a print job information list, the authentication information management unit 64 of the print job acquisition plug-in 32 may perform a user authentication process based on authentication information input by the user via the authentication server device 13, and the print job information list acquisition unit 61 may acquire the print job information list of the authenticated user. Furthermore, when the user is not authenticated, the process of acquiring the print job information list is not executed, and an error notification screen is preferably displayed so that the processes of step S20 and beyond are not executed. As described below, by limiting the usage by performing authentication as described above, it is possible to prevent the account information of a user who is not authenticated from being sent, when sending account information to the account server device 14. FIG. 15 is an image diagram of an example of a menu screen.

A menu screen 1030 is an example in which one of the items is selected by a user, from among an item 1031 of "acquiring a print job information list", an item 1032 of "setting", an item 1033 of "version information", and an item 1034 of "end". When the item 1031 of "acquiring a print job information list" is selected, the print job information list acquisition unit 61 of the print job acquisition plug-in 32 acquires the print job information list from the print server device 12, and displays the print job information list on the display control unit 41. Note that when the item 1032 of "setting" is selected, a software environment setting screen is displayed. When the item 1033 of "version information" is selected, a software version information screen is displayed. When the item 1034 of "end" is selected, the software operation is terminated.

Figure 16:
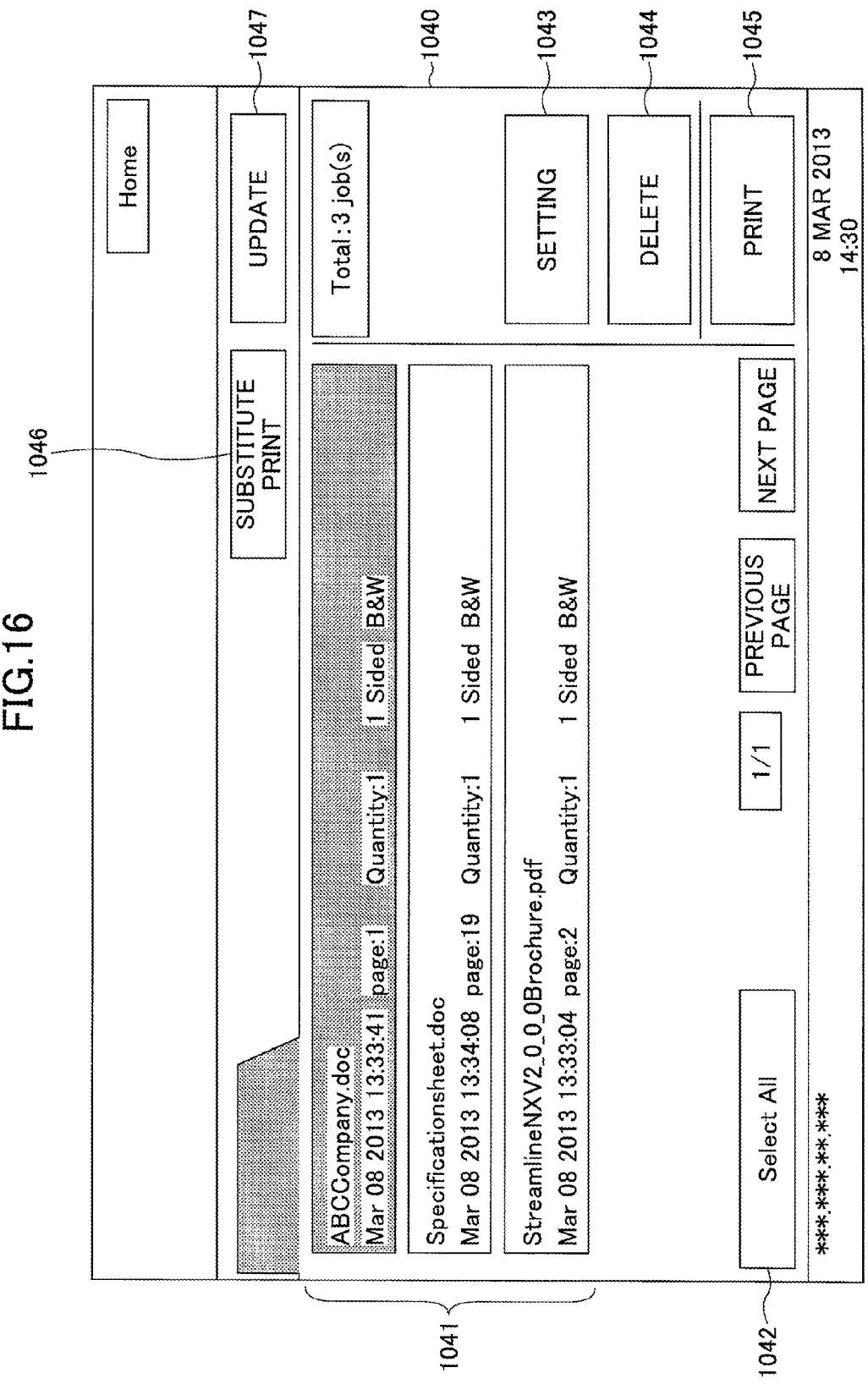
FIG. 16 is an image diagram of an example of a print job information list.

FIG. 16 is an image diagram of an example of a print job information list. A print job information list screen 1040 of FIG. 16 includes a list of print job information 1041 of the user. The list of print job information 1041 is a list of print job information items of print jobs of which the user is the owner, or a list of print job information items of print jobs of which the user is the substitute user. The display of a list of print job information items of print jobs of which the user is the owner and a list of print job information items of print jobs of which the user is the substitute user, may be switched by a substitute print button 1046 described below. Note that the list of print job information 1041 may be a list including both the print job information items of print jobs of which the user is the owner and the print job information items of print jobs of which the user is the substitute user.

In the list of print job information 1041, each print job information item is displayed by components that can be selected, such as buttons. For example, the components expressing the print job information items in FIG. 16 display the print job name, the date, the number of pages, the number of copies, the print side, and the color mode.

Furthermore, the print job information list screen 1040 of FIG. 16 includes a select all button 1042, a setting button 1043, a delete button 1044, a print button 1045, a substitute print button 1046, and an update button 1047.

The select all button 1042 is a button for selecting all of the print job information items in the list of print job information 1041. The setting button 1043 is a button for making settings with respect to the selected print job information, such as the setting of an output device to be the output destination, and changing the print settings such as the number of copies to be printed, the print side, and the color mode. The delete button 1044 is a button for deleting the selected print job information. The print button 1045 is a button for requesting to start the printing of the selected print job information.

The substitute print button 1046 is a button for displaying the print job information that the user can execute printing as the substitute user. Note that when the substitute print button 1046 is pressed, for example, instead of the substitute print button 1046, an owner print button may be displayed, which displays the print job information items that the user can execute printing as the owner. The update button 1047 is a button for updating the list of print job information 1041. When the update button 1047 is pressed, the print job information list acquisition unit 61 of the print job acquisition plug-in 32 acquires the print job information list again from the print server device 12.

Note that the display control of displaying screens in the flow of the printing process, such as the displaying of the menu screen 1030 and the print job information list screen 1040, is executed by the display control unit 41. Furthermore, the print job information list acquired by the print job information list acquisition unit 61 is managed by the print job management unit 63.

In step S21, the print job acquisition unit 62 of the print job acquisition plug-in 32 acquires, from the print server device 12, the print job selected from the print job information list. That is to say, when the user selects print job information from the list of print job information 1041, and presses (select/ input) the print button 1045, the print setting screen 1000 as illustrated in FIG. 10 is displayed (transition of screen), and the user specifies the output device that is the desired output destination from the printer selection field 1001 of the print setting screen 1000 (here, it is assumed that the output device 16 has been specified). Note that with respect to print settings relevant to the output configuration of the print data such as the printing range, the number of copies to be printed, double-sided/single-sided, color/monochrome, and combining, the settings selected in the print job registration process of FIG. 11 are displayed, in a manner that these settings cannot be changed. When the user presses the "OK" button 1003 of in the print setting screen 1000, the print job management unit 63 sets the output destination of the print job specified by the user, and the print job acquisition unit 62 acquires the print job of the selected print job information from the print server device 12.

Note that also when the setting button 1043 is pressed, the print setting screen 1000 as illustrated in FIG. 10 is displayed, and the user can make similar settings. Therefore, when the user presses the print button 1045, and the output device that is the output destination is already set, there is no need to display the print setting screen 1000 again.

Furthermore, the print setting screen 1000 may be displayed such that it is possible to select (change) the print setting relevant to the output configuration of the print data. For example, an item for setting the authority as to whether the owner user can make changes (for example, a check box for specifying changes), may be added to the substitute user selection screen 1020 illustrated in FIG. 13. The print job processing unit 51 adds, to the print job information, information of a substitute user including the authority of whether changes can be made, by the substitute user set by the owner user in step S14 of FIG. 11. According to the authority of the substitute user, display control may be implemented to display the print setting screen 1000 such that the print settings relevant to the output configuration of the print data can be changed, or such that the print settings relevant to the output configuration of the print data cannot be changed.

Furthermore, instead of setting the authority each time a print job is registered, the following operations may be performed. Specifically, the owner user sets, for the substitute user in advance, as to whether it is possible to change the print setting relevant to the output configuration of the print data. Then, the print job processing unit 51 adds, to the print job information, the authority of the substitute user selected by the owner user in the substitute user selection screen 1020.

Furthermore, the items that can be selected in the print job information list screen 1040 and the print setting screen 1000 may be collectively displayed in a single screen. When the print setting relevant to the output configuration of the print data is changed, and the "OK" button 1003 in the print setting screen 1000 is pressed, the print job management unit 63 sets the changed print setting as the print setting of the print job.

Note that separate screens are provided, such that the print job information list screen acquired from the print server device 12 by the user with client terminal 11b and displayed, and the print job information list screen acquired from the print server device 12 by the user with output device 15 and displayed, are to have substantially the same screen configurations.

That is to say, the print setting screen 1000 is a screen for giving a print request with respect to each print job, and the print job information list screen 1040 is a screen for displaying a list of print jobs requested by the print requests. Therefore, these screens have different configurations. Furthermore, there may be cases where the print setting screen 1000 for giving print requests for each of the print jobs is not used in the output device 15.

Thus, on the client terminal 11b, a print job information list screen that is substantially the same as (or similar to) the print job information list screen to be displayed on the output device 15 is displayed, and a separate screen including settings of output destinations with respect to the specified print job is also displayed. Therefore, by a screen displayed in either one of the devices, the same operability is provided for the user.

Therefore, the print job information list screen 1040 of FIG. 16 is one example, but the print job information list screen 1040 preferably has the same screen configuration as that of the print job information list screen displayed on the output device 15. Note that according to the same reason, when the print button 1045 is pressed, the print setting screen 1000 as illustrated in FIG. 10 is displayed. However, if there are no items to be set other than the specification of the output device that is the output destination, a display of the print setting screen 1000 including other items is a redundant display for the user. Therefore, in consideration of such a case, it is possible to display a screen that is only used for setting the output device that is the output destination, when the print button 1045 is pressed.

In the following, a description is given of an example where the print job information selected by a user in the print job information list, is the print job information of the print job that can be printed by this user acting as a substitute user.

In step S22, the print data processing unit 71 of the print plug-in 33 determines whether the print data included in the print job acquired by the print job acquisition unit 62 in step S21 is intermediate print data. When the print data included in the acquired print job is intermediate print data, the process proceed to step S23. When the print data included in the acquired print job is not intermediate print data, the process proceed to step S24.

In step S23, the print data processing unit 71 of the print plug-in 33 uses a real printer driver 22 corresponding to the output device that has been set as the output destination (the output device specified as the output destination by the user), to convert the intermediate print data into real print data that can be printed by the output device that is the output destination (the output device 16 in this example).

In step S24, the print data transmission unit 72 of the print plug-in 33 sends the real print data to the output device 16 that is the output destination. Accordingly, the output device 16 starts (executes) the output of the print data by the print setting set in the print job information included in the print job.

According to the printing process of FIG. 14, the user acquires, from the print server device 12, the print job for which this user is acting as the substitute user, sends the print data to the output device 16 that is locally connected to the client terminal 11b, and outputs the print data at the output device 16.

Note that in the above example, the print data is sent to the output device 16 that is locally connected to the client terminal 11b; however, the present invention is not so limited. That is to say, for example, the print data may be sent to the output device 15. In this case, in the process of step S22, the user is to use the real printer driver 22 corresponding to the output device 15. Accordingly, if the client terminal 11b has the function of generating real print data corresponding to the output device 15 (the real printer driver 22 corresponding to the output device 15), it is possible to execute the output of print data at the output device 15.

Account Information Transmission Process

Figure 17:
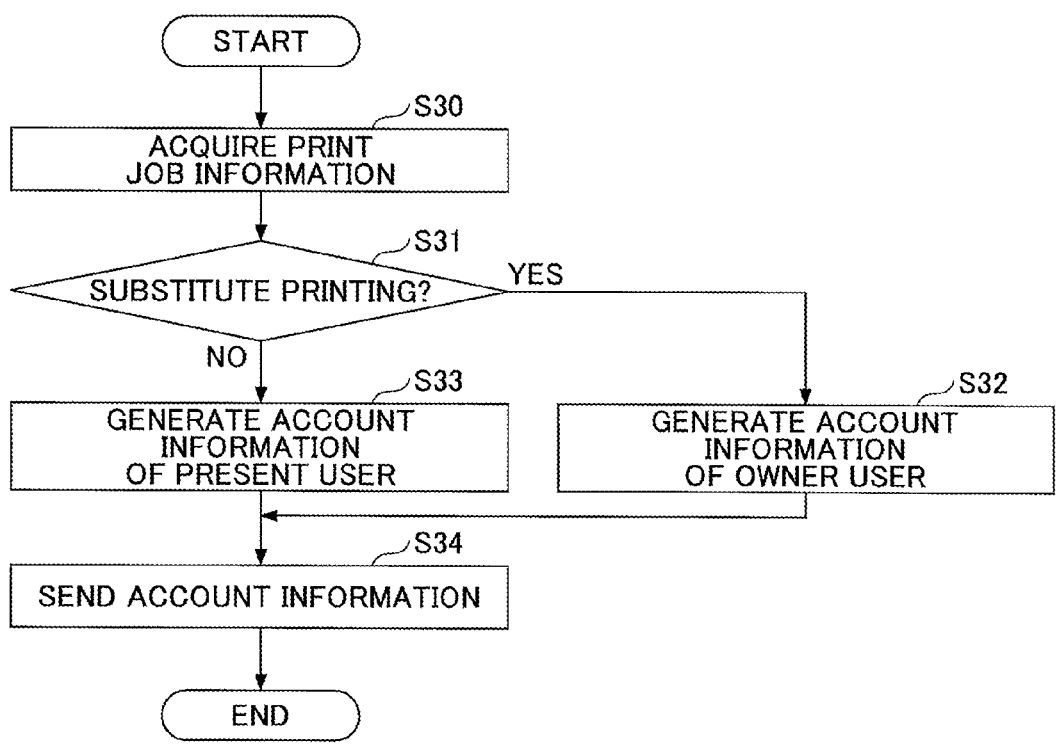
FIG. 17 is a flowchart of an account information transmission process.

Next, a description is given of a process of generating account information and sending the account information to the account server device 14. FIG. 17 is a flowchart of an account information transmission process.

In step S30, when the account data generation unit 81 of the account transmission plug-in 34 receives a notification that the print data output process has been completed from the print plug-in 33, the account data generation unit 81 of the account transmission plug-in 34 acquires, from the print plug-in 33, print job information of the print job for which the output process has been completed.

In step S31, the account data generation unit 81 of the account transmission plug-in 34 determines whether the print job for which the output process has been completed, has been substitute-printed, from the data items of the user ID and the substitute user ID in the acquired print job information. That is to say, the account data generation unit 81 determines whether the user ID of the present user is set as the user ID of the owner user of the print job information, or set as the user ID of the substitute user of the print job information. When the print job has been substitute-printed, the process proceeds to step S32. When the print job has not been substitute-printed, the process proceeds to step S33.

When the print job has been substitute-printed, in step S32, the account data generation unit 81 of the account transmission plug-in 34 generates account information of the owner user of the print job for which the output process has been completed. That is to say, the account information of the user set as the user ID of the print job information, is generated. In this case, the account information includes, for example, the user ID, the number of printed pages, the number of copies, the sheet side, and the color mode.

When the print job has not been substitute-printed, in step S33, the account data generation unit 81 of the account transmission plug-in 34 generates account information of the present user of the print job for which the output process has been completed.

In step S33, the account transmission unit 82 of the account transmission plug-in 34 sends the account information to the account server device 14.

According to the account information transmission process of FIG. 17, account information is generated also in the case of performing substitute-printing by the output device 16 locally connected to the client terminal 11b, and the account information can be sent to the account server device 14. Furthermore, the account information may be generated as the account information of the owner user, instead of the account information of the substitute user.

Note that instead of the processes of steps S31 through S33, it is possible to generate account information for the user ID registered as the item value in the user ID of the print job information. In this case also, the account information may be generated as the account information of the owner user, instead of the account information of the substitute user.

Note that when the output device that is the output destination is provided with a function of generating account information, the client terminal 11b may acquire the account information generated in the output device, instead of performing the process of generating account information Note that in step S33, the account transmission unit 82 may send the account information to the print server device 12, and the print server device 12 may send the account information to the account server device 14. In this case, each of the client terminals 11 is to register the print server device 12, from which the print job is acquired, as the transmission destination of the account information, and there is no need to set the connection destinations of both the print server device 12 and the account server device 14. Furthermore, the connection destination of the account server device 14 is to be set in the print server device 12.

Overview

In the printing system 1 according to the present embodiment, the substitute user can perform substitute-printing by selecting an output device that can be specified in the client terminal 11. Thus, for example, the substitute user can perform substitute-printing by an output device that is locally connected. Accordingly, the user performing the substitute-printing can perform the substitute-printing with an output device locally connected to his/her own client terminal 11, without the need to go over to an output device connected to the network.

Furthermore, in the printing system 1 according to the present embodiment, by converting the print data into intermediate print data and registering the intermediate print data in the print server device 12, it is possible to perform substitute-printing without depending on the output device.

Furthermore, a print job according to a print request from the client terminal 11a can be printed at an output device specified in the client terminal 11b. Therefore, even when an output device cannot be specified by the client terminal 11a (for example, an output device locally connected to the client terminal 11b, or an output device that is not set for the client terminal 11a but is set for the client terminal 11b), but the output device can be specified by the client terminal 11b, this output device can be set as the output destination and can be used for printing.

Furthermore, in the printing system 1 according to the present embodiment, when the printing of a print job, which the client terminal 11 has acquired from the print server device 12, is performed at an output device specified at the client terminal 11, the account can be sent from the client terminal 11 to the account server device 14. Thus, for example, even when substitute-printing is performed at an output device locally connected to the client terminal 11, the account information of the owner user of the print job relevant to the substitute-printing can be accumulated in the account server device 14.

The terminal device, the output system, and the output method are not limited to the specific embodiments described herein, and variations and modifications may be made without departing from the spirit and scope of the present invention.

Note that the application scope of the present invention is not limited to printing purposes, and therefore the application scope of the present invention is not limited to an output system for handling print data and print job information. The print server device 12 is an example of a data saving device that saves, manages, and sends, to an output device, the output data such as print data and the output data relevance information that is information relevant to output data such as print data and output data such as print job information. Therefore, for example, when the output device is a projector, it is possible to save the display data (output data) that is desired to be displayed (projected) with the use of a projector, and it is possible to save a setting (output data relevance information) such as the display method when displaying the data. Furthermore, it is possible to save both the print data and the display data, and it is possible to send output data and output data relevance information corresponding to the output device, to a plurality of output devices for outputting different output data, such as a multifunction peripheral for printing print data and a projector for displaying display data.

Note that the above-described printing system 1 is an example of an output system. The client terminal 11 is an example of a terminal device, which is a device that the user uses to give an output request or execute an output process of output data. The print server device 12 is an example of an information processing device that functions as a device for managing the output data and user information of the user who is the executor of the output data. The account server device 14 is an example of an information processing device functioning as a device that includes the account information relevant to the output of the output data in information of the user giving the output request and the user requesting the execution of the output, and that stores and manages this information. The display device 102 is an example of a display unit for displaying a screen.

The virtual printer driver 21 and the real printer driver 22 are examples of conversion units for converting the data format of the output data. Furthermore, the virtual printer driver 21 is an example of a first conversion unit for converting the data format of the output data into a data format of intermediate data. Furthermore, the real printer driver 22 is an example of a second conversion unit for converting the data format of the output data into a data format of the real output data.

The print job processing unit 51 is an example of an output data relevance information generation unit for executing a process of generating output data relevance information in which the user who requested the output, and another user (substitute user) specified by the user, are set as the executor who can execute the output of the output data. Furthermore, the print job processing unit 51 is an example of a substitute user setting unit for setting a substitute user as the executor, or setting the authority of the substitute user in the outputting. Furthermore, the print job processing unit 51 is an example of a conversion control unit for controlling the data format of the output data when sending the output data to the information processing device, or for controlling a conversion unit that converts the data format of the output data, based on settings relevant to the output of the output data.

The print authority management unit 52 is an example of a substitute user information management unit for managing user information of the user who can be selected as the substitute user by the user requesting the output. Furthermore, the print authority management unit 52 is an example of a substitute user authority management unit for managing authority information relevant to the output by a substitute user, such as the changing authority for changing the setting relevant to the output configuration when the substitute user outputs the output data.

The print job transmission unit 53 is an example of an output information transmission unit for sending, to the information processing device, the output data and output information such as output data relevance information.

The print job information list acquisition unit 61 is an example of an output data list acquisition unit for acquiring, from the information processing device, list information of output data, for which the user using the terminal device is set as the executor (or the user authenticated in the terminal device). The print job acquisition unit 62 is an example of an output data acquisition unit for acquiring the output data from the information processing device.

The print job management unit 63 is an example of an output destination setting unit for setting the output device specified as the output destination of the output data. Furthermore, the print job management unit 63 is an example of an output setting unit for receiving a setting relevant to the output configuration of output data specified by the user. The authentication information management unit 64 is an example of an authentication management unit for executing an authentication process of authenticating the user.

The print data processing unit 71 is an example of an output data generation control unit for executing the control of a process of generating output data according to the output destination, from the output data acquired from the information processing device. Furthermore, an example of the generation control of output data is implementing control to cause a conversion unit to execute the conversion of a data format of the output data into a data format according to the output destination.

The print data transmission unit 72 is an example of an output data transmission unit for sending, to the output device that is the output destination, the output data acquired from the information processing device. As the output destination, it is possible to select an output device connected to the terminal device or an output device that can be specified at the terminal device; one example is an output device locally connected to the terminal device.

In the present output system, at least one information processing device constitutes the output control system, and in at least one of the information processing devices, output data and output relevance information are saved, and an output information management unit for managing the saved information is provided. Furthermore, an account information saving unit for saving account information is provided. In the present output system, the output device includes an output unit for executing the output of the output data.

Furthermore, the owner user and the substitute user are used for describing a usage scene in which the owner user requests the substitute user to execute the output. The present invention is not only applicable to such a usage scene. This example indicates that at least the owner user and the substitute user are different users; for example, the users may be indicated as different users by being referred to as a first user and a second user.

According to one embodiment of the present invention, a terminal device, an output system, and an output method are provided, by which the user can output the output data to an output device connected to a terminal device, by making effective use of the functions and the performance of the terminal device.

The present application is based on and claims the benefit of priority of Japanese Priority Patent Application No. 2013-215476, filed on Oct. 16, 2013, the entire contents of which are hereby incorporated herein by reference.

What is claimed is:

1. A terminal device to which an information processing device and an output device are connected, the terminal device comprising:
   a substitute user setting unit configured to set a substitute user as an executor capable of executing output of output data specified by a user requesting the output of the output data, the substitute user being different from the user requesting the output of the output data;
   an output information transmission unit configured to send, to the information processing device, the specified output data and output data relevance information including substitute user information identifying the substitute user;
   an output data acquisition unit configured to acquire the output data, of which the output is set as being executable by the executor, from the information processing device;

an output data transmission unit configured to send the output data acquired by the output data acquisition unit, to the output device connected to the terminal device;
a conversion unit configured to convert a data format of the output data, the conversion unit including,
  a first conversion unit configured to convert the data format of the output data into a data format of intermediate data, and
  a second conversion unit configured to convert the data format of the output data into a data format of real output data;
an output destination setting unit configured to set an output device specified as an output destination of the output data acquired by the output data acquisition unit; and
an output data generation control unit configured to control a process of generating, from the output data acquired by the output data acquisition unit, output data corresponding to the output destination set by the output destination setting unit, by causing the second conversion unit to execute the converting of the data format in accordance with the output destination that has been set by the output destination setting unit,
wherein the output data transmission unit is configured to send, to the output device set by the output destination setting unit, the output data corresponding to the output destination generated from the output data acquired by the output data acquisition unit.

2. The terminal device according to claim 1, further comprising:
an account information transmission unit configured to send account information of the output data, when the output data has been output from the output device connected to the terminal device.

3. The terminal device according to claim 1, wherein the output information transmission unit sends the output data whose data format has been converted by the conversion unit.

4. The terminal device according to claim 3, further comprising:
a conversion control unit configured to control the conversion by the conversion unit, based on a setting relevant to the output of the output data specified by a selection by the user, wherein
the conversion control unit controls the data format of the output data specified as a target of output by the user, to be converted into the data format of intermediate data or into the data format of real output data, based on the setting relevant to the output of the output data, and
the output information transmission unit sends the output data whose data format has been converted into the data format of intermediate data or the data format of real output data, by the control of the conversion control unit.

5. The terminal device according to claim 1, further comprising:
an output destination setting unit configured to set the output device specified as an output destination of the output data acquired by the output data acquisition unit, wherein
the output data transmission unit sends the output data acquired by the output data acquisition unit to the output device set by the output destination setting unit.

6. The terminal device according to claim 5, further comprising:
an output data generation control unit configured to control a process of generating, from the output data acquired by the output data acquisition unit, output data corresponding to the output destination set by the output destination setting unit, wherein the output data transmission unit sends the output data corresponding to the output destination generated from the output data acquired by the output data acquisition unit, to the output device set by the output destination setting unit.

7. The terminal device according to claim 1, further comprising:
an authentication management unit configured to execute an authentication process of authenticating the user; and
an output setting unit configured to receive a setting relevant to an output configuration of the output data specified by the user, wherein
the substitute user setting unit sets a change authority to change the setting relevant to the output configuration of the output data, when the substitute user executes the output of the output data as the executor of the output data, and
the output setting unit receives a setting change based on the change authority of the user, when specifying the setting relevant to the output configuration of the output data for which the user authenticated by the authentication management unit is set as the substitute user.

8. The terminal device according to claim 1, further comprising:
an output data list acquisition unit configured to acquire, from the information processing device, list information of the output data, of which the output is set as being executable by the executor; and
a display control unit configured to control display of a setting screen on a display unit, the setting screen being used for selecting output data for which output is to be executed, from the list information of the output data and selecting an output destination of at least the selected output data, wherein
the output data acquisition Unit acquires the output data selected from the list information of the output data, and
the output data transmission unit sends the output data acquired by the output data acquisition unit to the output device selected as the output destination.

9. The terminal device according to claim 8, wherein
the display control unit
  displays, on the display unit, a first setting screen used for selecting output data for which output is to be executed from the list information of the output data, and
  displays, on the display unit, a second setting screen used for selecting an output destination of at least the selected output data, and
  in the first setting screen, a selection of screen transition can be input for switching to the second setting screen.

10. The terminal device according to claim 1, wherein
the output data transmission unit sends the output data to the output device that is locally connected to the terminal device.

11. An output system comprising:
an output control system constituted by at least one information processing device;
an output device;
a terminal device;
a substitute user setting unit configured to set a substitute user as an executor capable of executing output of output data specified by a user requesting the output of the output data, the substitute user being different from the user requesting the output of the output data;
an output information transmission unit configured to send, by the terminal device to the output control system, the specified output data and output data relevance information including substitute user information identifying the substitute user;

an output information management unit configured to save and manage, by the output control system, the output data and the output data relevance information;

an output data acquisition unit configured to acquire, by the terminal device from the output control system, the output data of which the output is set as being executable by the executor, from the information processing device;

an output data transmission unit configured to send the output data acquired by the output data acquisition unit, to the output device connected to the terminal device;

an output unit configured to receive, by the output device, the output data sent by the output data transmission unit, and to execute, by the output device, the output of the data;

a conversion unit configured to convert a data format of the output data, the data unit including,
- a first conversion unit configured to convert the data format of the output data into a data format of intermediate data, and
- a second conversion unit configured to convert the data format of the output data into a data format of real output data;

an output destination setting unit configured to set the output device specified as an output destination of the output data acquired by the output data acquisition unit; and an output data generation control unit configured to control a process of generating, from the output data acquired by the output data acquisition unit, output data corresponding to the output destination set by the output destination setting unit, by causing the second conversion unit to execute the converting of the data format in accordance with the output destination that has been set by the output destination setting unit, wherein the output data transmission unit is configured to send the output data corresponding to the output destination generated from the output data acquired by the output data acquisition unit, to the output device set by the output destination setting unit.

12. An output method performed by an output system including one or more output devices configured to execute output of output data, an output control system constituted by at least one information processing device, the output control system being configured to manage the output data and user information of an executor of the output data, and each of a plurality of terminal devices connected to at least one of the one or more output devices and the output control system, the plurality of terminal devices including at least a first terminal device used by a first user and a second terminal device used by a second user, the output method comprising:

setting, at the first terminal device, a second user specified by the first user as the executor capable of executing the output of the output data specified by the first user;

acquiring, at the second terminal device, the output data set by the first user for which the second user is set as the executor in the output control system;

sending the output data set by the first user, from the second terminal device to the at least one output device to which the second terminal device is connected, the at least one output device to which the second terminal device is connected being an output destination specified by the second user; and outputting, by the output device that is the output destination specified by the second user, the output data specified by the first user, converting a data format of the output data by,
  converting the data format of the output data into a data format of intermediate data, and
  converting the data format of the output data into a data format of real output data;

setting, at the second terminal, an output device specified as an output destination of the output data acquired by the second terminal;

controlling a process of generating, from the output data acquired by the second terminal, output data corresponding to the output destination set by the second terminal, by executing the converting of the data format in accordance with the output destination that has been set by the second terminal; and sending, to the output device set by second terminal, the output data corresponding to the output destination generated from the acquired output data.

* * * * *